United States Patent [19]

Mori

[11] Patent Number: 4,676,023
[45] Date of Patent: Jun. 30, 1987

[54] CULTIVATION DEVICE BY USE OF WATER-AND-AIR MIXTURE

[76] Inventor: Kei Mori, 3-16-3-501, Kaminoge, Setagaya-ku, Tokyo, Japan

[21] Appl. No.: 825,714

[22] Filed: Feb. 3, 1986

[30] Foreign Application Priority Data

Feb. 6, 1985 [JP] Japan .................................. 60-21396
Feb. 12, 1985 [JP] Japan .................................. 60-25722

[51] Int. Cl.⁴ .............................................. A01G 9/24
[52] U.S. Cl. .......................................... 47/82; 47/79; 47/48.5
[58] Field of Search ............. 47/48.5, 62, 79, 82, 47/83; 137/393, 433, 449

[56] References Cited

U.S. PATENT DOCUMENTS

| | | | |
|---|---|---|---|
| 2,613,994 | 10/1952 | Peters | 137/433 |
| 2,896,374 | 7/1959 | Perin | 47/62 |
| 3,168,224 | 2/1965 | Rios | 47/79 |
| 4,033,072 | 7/1977 | Kobayashi et al. | 47/62 |
| 4,157,770 | 6/1979 | Roos | 47/79 |
| 4,177,604 | 12/1979 | Friesen | 47/62 |
| 4,393,890 | 7/1983 | Skappel | 47/48.5 |

FOREIGN PATENT DOCUMENTS

502668 3/1939 United Kingdom .................... 47/60

Primary Examiner—Richard T. Stouffer
Assistant Examiner—Bradley M. Lewis
Attorney, Agent, or Firm—Jordan and Hamburg

[57] ABSTRACT

A cultivation device by use of water-and-air mixture. The device comprises of an air pump having an ejecting outlet end portion installed in a culture fluid tub, a water guiding tube having a cone-shaped inlet opposing to the discharging outlet in the culture fluid tub, a lever mechanism for storing culture fluid emitted from the other end portion of the water guiding tube at the location of the end portion thereof and discharging the culture fluid when the amount of the stored culture fluid comes up to the predetermined one, and cultivation pallets by use of water-and-air mixture, which are installed in an inclined state and supplied with the culture fluid discharged from the lever mechanism.

6 Claims, 2 Drawing Figures

CULTIVATION DEVICE BY USE OF WATER-AND-AIR MIXTURE

BACKGROUND OF THE INVENTION

The present invention relates to a cultivation device by use of water-and-air mixture and a preferable device for supplying water intermittently to the cultivation device.

Heretofore, a cultivation method by use of water-and-air mixture has been well known as an improved cultivation method in contrast with the same by use of water only. According to the improved method, oxygen is supplemented to the culture fluid by causing oxygen or air to blow into the culture fluid. Furthermore, it has been already well known that, in the case of performing the cultivation by use of water-and-air mixture, the plants can be nurtured more effectively by intermittently supplying water-and-air mixture to the plants rather than by continuously supplying the same thereto, and as a result, healthy plant can be nurtured. However, the conventional cultivation device by use of water-and-air mixture comprises a supply device for intermittently supplying the culture fluid to the plants, and therefore, it follows that the construction of such device turns out to be complicated and the cost thereof increases. And further, in the case of performing the cultivating by use of water-and-air mixture on a ship, the culture fluid contained in the receptacle overflows outside by vibrating movement of the ship. Those are defects of the conventional device.

SUMMARY OF THE INVENTION

It is an object of the present invention is to provide a cultivation device by use of water-and-air mixture which is simple in construction and low-cost.

It is another object of the present invention to provide a device for supplying water intermittently which is simple in construction and low-cost, and further without fear of the culture fluid's overflowing.

DESCRIPTION OF THE PREFERRED EMBODIMENT

Figure 1:
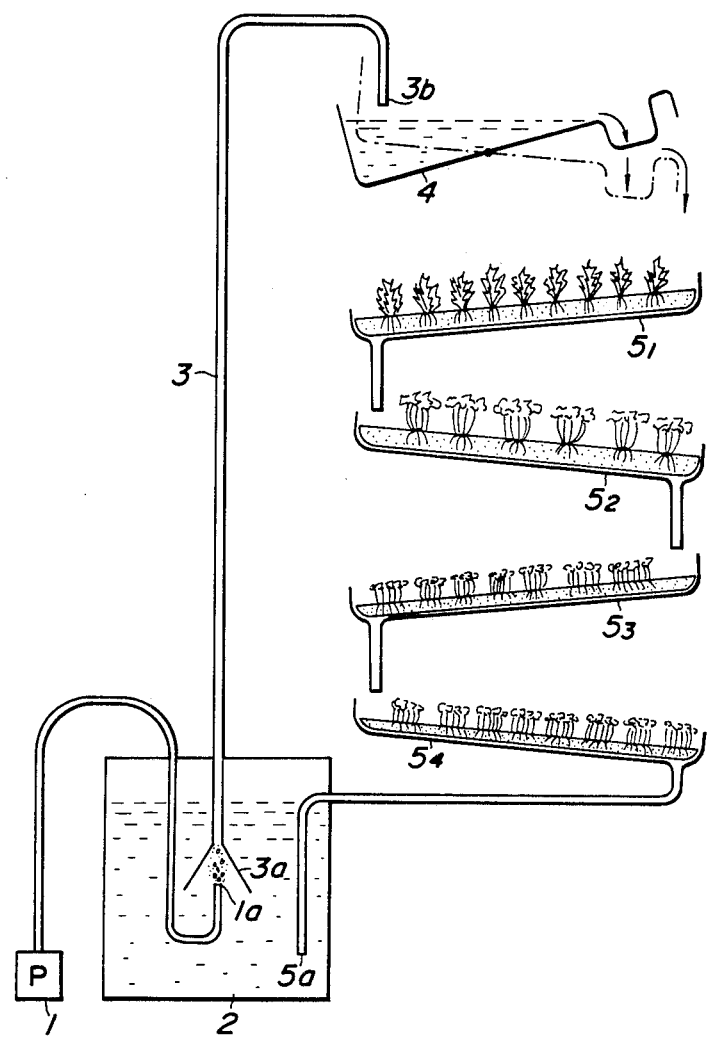
FIG. 1 is a structural view for explaining an embodiment of a cultivation device by use of water-and-air mixture according to the present invention.

FIG. 1 is a structural view for explaining an embodiment of a cultivation device by use of water-and-air mixture according to the present invention. In FIG. 1, 1 is an air pump, 2 a culture fluid tub, 3 a water guiding tube, 4 a lever mechanism, and $5_1$ through $5_4$ cultivation pallets by use of water-and-air mixture.

An end portion $3a$ of the water guiding pipe 3 is formed in a shape of cone in the culture fluid tub 2 and installed therein so as to oppose to an ejecting outlet $1a$ of the air pump 1. And therefore, compressed air ejected from the air pump 1 is guided into the water guiding pipe 3 and supplied to the lever mechanism 4 from another end portion $3b$ of the water guiding pipe 3 which has a water supplying aperture. In such a manner, a sufficient amount of oxygen can be contained in the culture fluid.

The lever mechanism 4 gradually stores the culture fluid supplied as mentioned above. When the amount of the culture fluid stored in the lever mechanism 4 comes up to the predetermined one, the lever mechanism 4 is pivotally moved to the location shown by a dot-and-dash line and supplies the stored culture fluid to the cultivation pallets $5_1$ by use of water-and-air mixture which is installed under the lever mechanism 4. The numerals $5_1$ through $5_4$ represent the cultivation pallets by use of water-and-air mixture. Those pallets are installed in a stockade not shown in an inclined state as shown in FIG. 1.

In consequence, the culture fluid supplied to the uppermost-stage cultivation pallet $5_1$ by use of water-and-air mixture as mentioned before flows down in order to the lower-stage cultivation pallets $5_2$ through $5_4$. Finally, the culture fluid is returned from the discharging end portion $5a$ to the culture fluid tub 2. In such a construction, the respective pallets $5_1$ through $5_4$ are intermittently supplied with the culture fluid.

Figure 2:
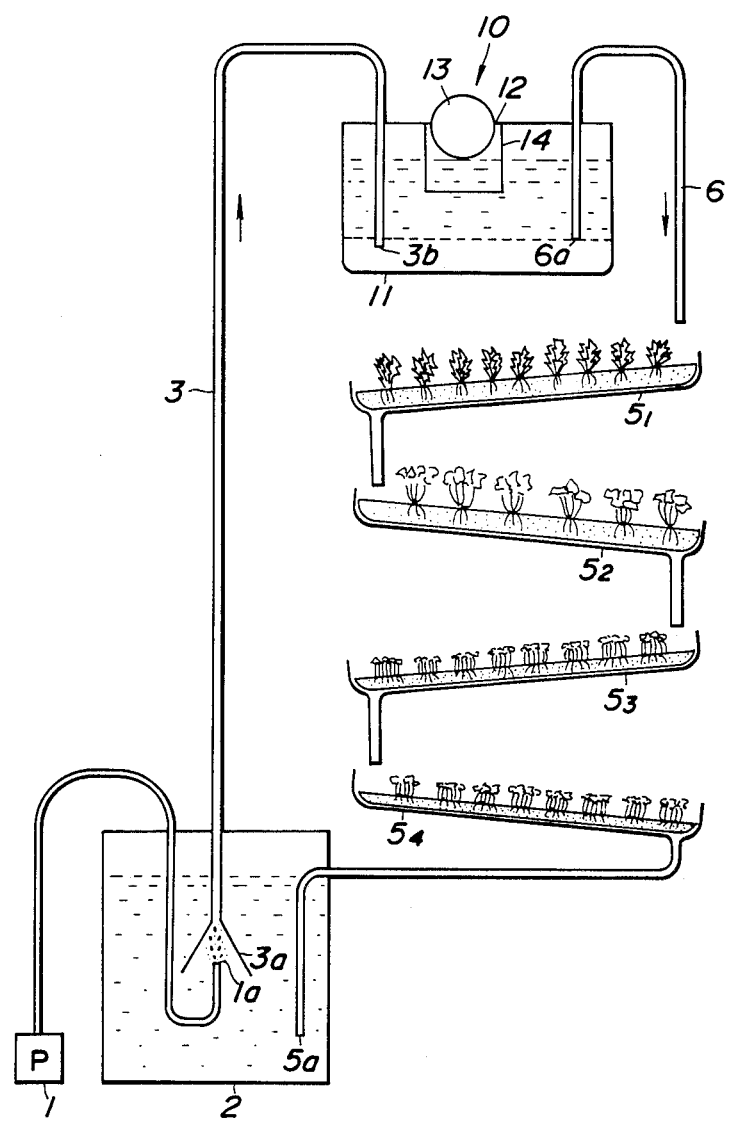
FIG. 2 is a structural view for explaining an embodiment of a supply device for supplying water intermittently according to the present invention which is applied to the cultivation device by use of water-and-air mixture.

FIG. 2 is a structural view for explaining an embodiment of a cultivation device by use of water-and-air mixture employing a supply device for supplying water intermittently according to the present invention. In FIG. 2, 10 is a supply device for supplying water intermittently according to the present invention.

An end portion $3a$ of the water supplying pipe water guiding tube 3 is formed in a shape of cone in the culture fluid tub 2 and installed so as to oppose to an ejecting outlet $1a$ of the air pump 1. And therefore, compressed air ejected from the air pump 1 is guided into the water supplying pipe 3 and supplied to the supply device 10 for supplying water intermittently from another end portion $3b$ of the water supplying pipe 3 which has a water supplying aperture. In such a manner, a sufficient amount of oxygen can be contained in the culture fluid.

The supply device 10 for supplying water intermittently stores gradually the culture fluid supplied as mentioned above. When the amount of the culture fluid stored in the supply device 10 comes up to the predetermined one, a predetermined amount of the culture fluid stored in such a manner as mentioned hereinafter is intermittently supplied through the water draining pipe 6 to the cultivation device by use of water-and-air mixture $5_1$ which is installed under the supply device 10. The numerals $5_1$ through $5_4$ represent the cultivation pallets by use of water-and-air mixture. Those pallets are installed in a stockade not shown in an inclined state as shown in FIG. 2.

In consequence, the culture fluid supplied to the uppermost-stage cultivation pallet $5_1$ by use of water-and-air mixture as mentioned before flows down in order to the lower-stage cultivation pallets $5_2$ through $5_4$. Finally, the culture fluid is returned from the discharging end portion $5a$ to the culture fluid tub 2. In such a construction, the respective pallets $5_1$ through $5_4$ are intermittently supplied with the culture fluid.

The supply device 10 for supplying water intermittently stores gradually liquid supplied through the water supplying pipe 3 as mentioned before. The device 10 comprises an air-tight tank 11 having an opening window 12 at the upper portion thereof, a float member 13 installed in the tank 11 so as to oppose to the opening window 12 of the tank 11, and a guiding net member 14 for causing the float member 13 to oppose to the opening window 12. And further, the water draining pipe 6 having an end portion 6a of the water draining aperture are constructed in a state of a siphon. In such a construction, when the amount of water contained in the air-tight tank 11 increases gradually, the opening window 12 is closed by the float member 13 at first, and then, water continues to be supplied to the tank after closing it so that the pressure of water (culture fluid) contained in the tank 11 is raised and finally the culture fluid contained therein flows out through the water draining pipe 6.

A siphon is constructed by the water draining pipe 6 together with the end portion 6a of the water draining aperture. Therefore, when the level of the culture fluid contained in the tank 11 is lowered to that of the end portion 6a of the water draining aperture, the operation of water draining comes to an end. At this time, the float member 13 descends and therefore the opening window 12 is kept to be opened. Afterward, the amount of the culture fluid increases gradually and same operation as mentioned before is performed repeatedly.

On that occasion, the amount of the culture fluid discharged from the tank 11 is as follows. Since the level of the culture fluid at a start-up time of discharging is approximately proportional to the height of the siphon (the head of water) and the level thereof at a suspension time of discharging is determined by the level of the end portion of the water draining aperture, it follows that the amount of the culture fluid discharged per one time becomes approximately uniform at all times. And further, the discharging amount thereof per one time can be adjusted by changing the level of the end portion of the water draining aperture.

Furthermore, although an embodiment of the supply device for supplying water intermittently according to the present invention which is applied to the cultivation device by use of water-and-air mixture has been described heretofore, it will be easily understood that the supply device according to the present invention may be applicable to the other various devices except for the one as mentioned before.

I claim:

1. A cultivation device comprising a container means for containing a culture fluid, an air pump, a first conduit means leading from the said air pump to the interior of said container means for conducting air to said container means, a fluid storage means, a second conduit means extending from said container means to said fluid storage means, said second conduit means comprising a generally vertical conduit portion having an inlet end and an inverted coneshaped member on said inlet end, said first conduit means having an air outlet end underlying said inverted cone-shaped member such that air discharged from said outlet end rises in said inverted cone-shaped member and passes upwardly into said second conduit means such that a mixture of culture fluid and air is thereby carried into said second conduit means to pass to said fluid storage means, pivotal means for pivotably mounting said fluid storage means for pivotal movement between a first pivotal position and a second pivotal position, said fluid storage means being maintained in said first pivotal position as said mixture of culture fluid and air flows from said second conduit means into said fluid storage means, said fluid storage means pivoting from said first position to said second position after an amount of said mixture of culture fluid and air has flowed into said fluid storage means, and a plurality of inclined cultivating pallets disposed to receive said mixture of culture fluid and air from said fluid storage means after said storage means has pivoted to said second position.

2. A cultivating device according to claim 1 further comprising a conduit between said cultivating pallets and said container means for returning culture fluid from said cultivating pallets to said container means.

3. A cultivation device comprising a container means for containing a culture fluid, an air pump, a first conduit means leading from the said air pump to the interior of said container means for carrying air to said container means, a fluid storage means, a second conduit means extending from said container means to said fluid storage means, said second conduit means comprising a generally vertical conduit portion having an inlet end and an inverted cone-shaped member on said inlet end, said first conduit means having an air outlet end underlying said inverted cone-shaped member such that air discharged from said outlet end rises in said inverted cone-shaped member and passes upwardly into said seond conduit means such that a mixture of culture fluid and air is thereby carried into said second conduit means to pass to said fluid storage means, said fluid storage means comprising an air-tight tank having an opening at an upper portion thereof, a float member in said tank, a guiding means for retaining said float member in a position opposite said opening such that the float member is movable between a closed position in which the fluid-air mixture in said tank floats said float member to close said opening and an open position in which the float member is spaced from said opening and retained opposite said opening by said guiding means, a plurality of inclined cultivating pallets disposed to receive said fluid-air mixture, a draining syphon pipe means extending from the inside of said air-tight tank to said cultivating pallets, said draining syphon pipe means having an inlet disposed within a lower portion of said air-tight tank such that said fluid-air mixture flowing into said air-tight tank from said second conduit means fills the air-tight tank causing said float member to move to said closed position, and continued flow of said fluid-air mixture into said air-tight tank forces the fluid-air mixture into said draining syphon pipe means to start syphoning such that the fluid-air mixture in said air-tight tank is syphoned out of said air-tight tank to said cultivating pallets by said draining syphon pipe means until the level of said fluid-air mixture in said air-tight tank reaches the level of said inlet to thereby break the syphon, whereby the float member moves from said closed position to said open position such that the cycle is repeatable.

4. A cultivating device according to claim 3 further comprising a conduit between said cultivating pallets and said container means for returning culture fluid from said cultivating pallets to said container means.

5. A cultivating device according to claim 3, wherein said draining syphon pipe means comprises an inverted U-shaped conduit having two leg portions with one leg portion extending down into said lower portion of said air-tight tank and the other leg portion extending to a position overlying said cultivating pallets.

6. A cultivating device according to claim 3 further comprising means for changing the amount of fluid-air mixture syphoned from said air-tight tank by changing the vertical position of said inlet of said draining syphon pipe means in said air-tight tank.

* * * * *